(12) United States Patent
Sundararajan et al.

(10) Patent No.: US 12,218,779 B2
(45) Date of Patent: *Feb. 4, 2025

(54) AUTOMATED CONNECTIVITY TO CLOUD RESOURCES

(71) Applicant: Cisco Technology, Inc., San Jose, CA (US)

(72) Inventors: Balaji Sundararajan, Fremont, CA (US); Madhuri Kolli, San Jose, CA (US); Giorgio Valentini, Walnut Creek, CA (US); Venkatraman Venkatapathy, Fremont, CA (US); Avinash Ashok Kumar Chiganmi, Fremont, CA (US); Vivek Agarwal, Campbell, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/674,166

(22) Filed: May 24, 2024

(65) Prior Publication Data
US 2024/0313997 A1    Sep. 19, 2024

Related U.S. Application Data

(63) Continuation of application No. 18/610,512, filed on Mar. 20, 2024, which is a continuation of application
(Continued)

(51) Int. Cl.
*H04L 12/46*    (2006.01)
*H04L 12/66*    (2006.01)
(Continued)

(52) U.S. Cl.
CPC ........ *H04L 12/4666* (2013.01); *H04L 12/465* (2013.01); *H04L 12/4675* (2013.01);
(Continued)

(58) Field of Classification Search
CPC ............... H04L 12/4666; H04L 12/465; H04L 12/4675; H04L 12/66; H04L 45/04; H04L 45/54
See application file for complete search history.

(56) References Cited

U.S. PATENT DOCUMENTS 10,187,289 B1 * 1/2019 Chen .................. H04L 45/02
10,735,263 B1    8/2020 McAlary et al.
(Continued)

FOREIGN PATENT DOCUMENTS

JP    2017518696 A    7/2017
WO    2020112345 A1    6/2020

OTHER PUBLICATIONS

Cisco Live !: "Cisco SDWAN Design Deployment", Imagine Intuitive, Barcelona, XP055735790, Jan. 28 Feb. 1, 2019, 84 Pages.
(Continued)

*Primary Examiner* — Mohamed A. Wasel
(74) *Attorney, Agent, or Firm* — Polsinelli P.C.

(57) ABSTRACT

The present technology pertains to receiving a tag associating at least one routing domain in an on-premises site with at least one virtual network in a cloud environment associated with a cloud service provider. The present technology also pertains to the automation of populating route and propagation tables with the cloud service provider.

21 Claims, 10 Drawing Sheets

Related U.S. Application Data

No. 17/898,214, filed on Aug. 29, 2022, now Pat. No. 11,985,007, which is a continuation of application No. 17/390,239, filed on Jul. 30, 2021, now Pat. No. 11,456,894.

(60) Provisional application No. 63/172,450, filed on Apr. 8, 2021.

(51) Int. Cl.
  *H04L 45/00* (2022.01)
  *H04L 45/02* (2022.01)
(52) U.S. Cl.
  CPC .............. *H04L 12/66* (2013.01); *H04L 45/04* (2013.01); *H04L 45/54* (2013.01)

(56) References Cited

U.S. PATENT DOCUMENTS

| | | |
|---|---|---|
| 11,252,084 B1 | 2/2022 | Cai et al. |
| 2012/0017008 A1 | 1/2012 | Twitchell, Jr. |
| 2013/0142201 A1 | 6/2013 | Kim et al. |
| 2014/0301192 A1 | 10/2014 | Lee et al. |
| 2016/0088092 A1 | 3/2016 | Cardona-Gonzalez et al. |
| 2017/0099160 A1 | 4/2017 | Mithyantha et al. |
| 2020/0059401 A1 | 2/2020 | Holmes et al. |
| 2020/0177503 A1 | 6/2020 | Hooda et al. |
| 2020/0235990 A1 | 7/2020 | Janakiraman et al. |
| 2021/0112000 A1 | 4/2021 | Forster et al. |
| 2021/0168125 A1 | 6/2021 | Vemulpali |
| 2021/0409303 A1 | 12/2021 | Pande et al. |
| 2022/0329477 A1 | 10/2022 | Chiganmi et al. |

OTHER PUBLICATIONS

International Preliminary Report on Patentability for International Application No. PCT/US2022/023518, mailed Oct. 19, 2023, 11 Pages.
Office Action for Australian Application No. 2022254668, dated Aug. 4, 2023, 4 Pages.
Yeluri R., et al., "Building the Infrastructure for Cloud Security", A Solution Review, Dec. 31, 2014, XP055468266, 240 Pages.
Office Action for Japanese Application No. 2022578955, dated Apr. 18, 2024, 04 Pages.

* cited by examiner

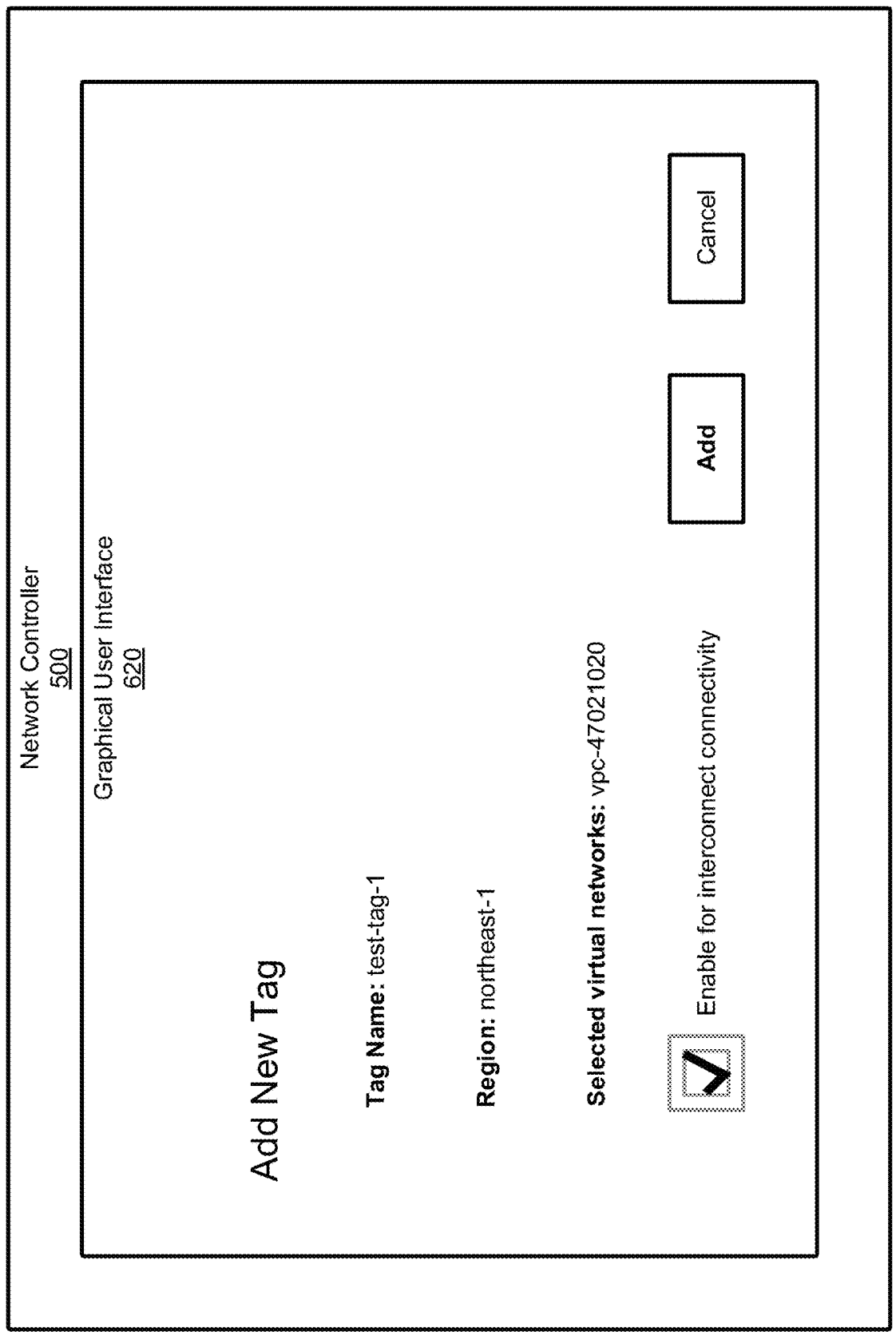

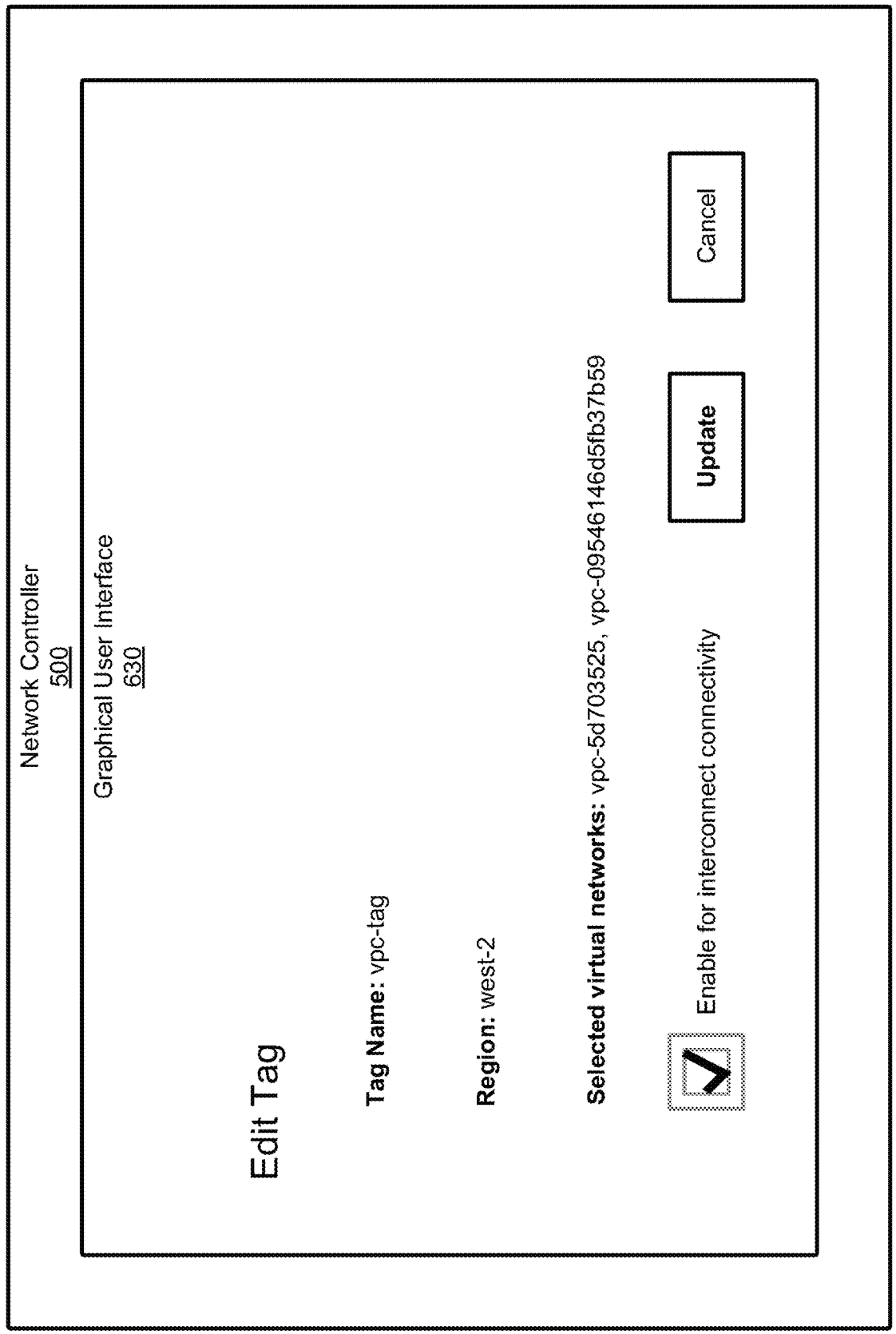

700

710 Receiving a tag associating at least one routing domain in an on-premises site with at least one virtual network in a cloud environment associated with a cloud service provider (CSP)

720 Configuring a virtual cross connect (VXC) on a software-defined wide-area network (SDWAN) router associated with a software-defined cloud infrastructure (SDCI) provider, the VSC connecting the on-premises site to the cloud environment associated with the CSP

730 Assigning border gateway protocol (BGP) parameters to the VXC

740 Configuring BGP peering on a connectivity gateway in the cloud environment associated with the CSP

750 Connecting the connectivity gateway to the at least one virtual network in the cloud environment

760 Tagging the at least one virtual network with the tag

770 Configuring a connection between the at least one routing domain in the on-premises site and the at least one virtual network in the cloud environment, wherein the connection is based at least in part on the tag

FIG. 7

AUTOMATED CONNECTIVITY TO CLOUD RESOURCES

CROSS-REFERENCE TO RELATED APPLICATIONS

This application is a continuation of U.S. patent application Ser. No. 18/610,512, filed on Mar. 20, 2024, entitled, "Automated Connectivity To Cloud Resources," which in turn claims priority to U.S. patent application Ser. No. 17/898,214, filed on Aug. 29, 2022, entitled, "Automated Connectivity To Cloud Resources," now U.S. Pat. No. 11,985,007 issued on May 14, 2024, which in turn claims priority to U.S. patent application Ser. No. 17/390,239 filed on Jul. 30, 2021, entitled, "Automated Connectivity To Cloud Resources," now U.S. Pat. No. 11,456,894 issued on Sep. 27, 2022, which in turn claims priority to U.S. Patent Application No. 63/172,450, filed on Apr. 8, 2021, entitled "Automated Workload Mapping of Cloud IaaS and Cloud Partner Interconnect," the contents of which are incorporated herein by reference in their entirety.

DESCRIPTION OF THE RELATED TECHNOLOGY

The present technology relates in general to the field of computer networking, and more particularly, to methods, systems, and non-transitory computer-readable storage media for automating connectivity to cloud resources.

BACKGROUND

Enterprise networks often implement diverse and complex network topologies to fulfill enterprise demands. The increasing diversity and complexity of such networks puts a greater strain on network administrators, and opens the door for more problems to occur, such as lower-than-desired uptime. Establishing and managing network connectivity can be very challenging and time-consuming for network administrators, and often result in lower guarantees for stable/accurate connectivity, lower uptime, and/or lack of certain desirable features.

BRIEF DESCRIPTION OF THE DRAWINGS

In order to describe the manner in which the various advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not, therefore, to be considered to be limiting of its scope, the principles herein are described and explained with additional specificity and detail through the use of the accompanying drawings in which:

FIGS. 6A-6C illustrate examples of graphical user interfaces (GUIs) for a network controller;

FIG. 7 is a flowchart of a method for automating connectivity to cloud resources in accordance with some examples of the present disclosure.

DETAILED DESCRIPTION

Figure 1:
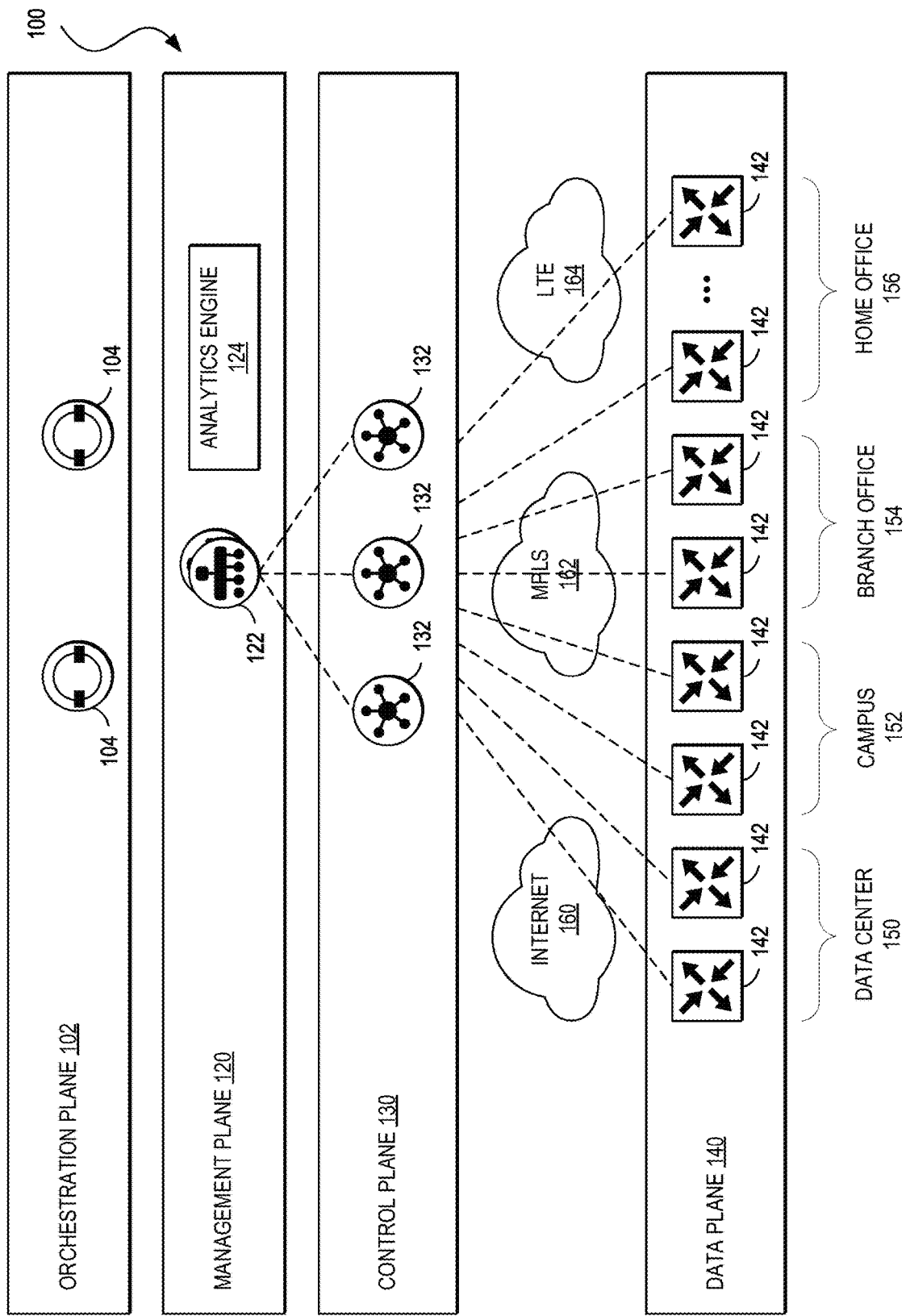
FIG. 1 illustrates an example of a high-level network architecture in accordance with some examples of the present disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various embodiments given in this specification.

Without intent to limit the scope of the disclosure, examples of instruments, apparatus, methods, and their related results according to the embodiments of the present disclosure are given below. Note that titles or subtitles may be used in the examples for the convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control. Additional features and advantages of the disclosure will be set forth in the description which follows, and in part will be obvious from the description, or can be learned by practice of the herein disclosed principles.

The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

Overview

The present technology provides methods, systems, and non-transitory computer-readable storage media are provided for automating connectivity to cloud resources.

An example method can include receiving a tag associating at least one routing domain in an on-premises site with at least one virtual network in a cloud environment associated with a cloud service provider (CSP). The method can also include configuring a virtual cross connect (VXC) on a software-defined wide-area network (SDWAN) router associated with a software-defined cloud infrastructure (SDCI) provider, the VXC connecting the on-premises site to the cloud environment associated with the CSP. The method can also include assigning border gateway protocol (BGP) parameters to the VXC. The method can also include configuring BGP peering on a connectivity gateway in the cloud environment associated with the CSP. The method can also include connecting the connectivity gateway to the at least one virtual network in the cloud environment. The method can also include tagging the at least one virtual network with the tag. The method can also include configuring a connection between the at least one routing domain in the on-premises site and the at least one virtual network in the cloud environment, wherein the connection is based at least in part on the tag.

In some embodiments of the method, connecting the connectivity gateway to the at least one virtual network can include invoking an API to use an interface associated with the SDCI provider. The method can also include using the interface to connect to the connectivity gateway. The method can also include mapping the tag to the at least one virtual network.

In some embodiments of the method, mapping the tag to the at least one Virtual networks, for each of the at least one Virtual networks, includes attaching a cloud gateway to the at least one virtual network in the cloud environment. The method can also include saving an existing routing table for the at least one virtual network. The method can also include creating a new routing table for the at least one virtual network. The method can also include adding, to the new routing table, a default route pointing to the cloud gateway. The method can also include enabling route propagation based on the new routing table. The method can also include associating the cloud gateway to the connectivity gateway, wherein an advertised prefix list is set to an address prefix for the at least one virtual network.

In some embodiments of the method, configuring the connection between the at least one routing domain in the on-premises site and the at least one virtual network can include providing a BGP configuration to the SDWAN router. The method can also include providing a segment configuration to the SDWAN router. The method can also include providing a sub-interface configuration to the SDWAN router based on a virtual local area network (VLAN).

In some embodiments, the method also includes updating the tag. The method can also include automatically discovering connections affected by the tag. The method can also include automatically discovering one or more virtual networks on the cloud environment affected by the tag. The method can also include attaching a new cloud gateway to the one or more virtual networks affected by the tag.

In some embodiments, the method also includes updating an existing routing table for the one or more virtual networks affected by the tag. The method can also include enabling route propagation based on the existing routing table. The method can also include attaching the new cloud gateway to an affected connectivity gateway belonging to the connections affected by the tag and the one or more virtual networks affected by the tag.

In some embodiments of the method, updating the tag includes adding one or more new Virtual networks corresponding to the one or more virtual networks to the tag.

An example system can include one or more processors and at least one computer-readable storage medium storing instructions which, when executed by the one or more processors, cause the one or more processors to receive a tag associating at least one routing domain in an on-premises site with at least one virtual network in a cloud environment associated with a cloud service provider (CSP). The instructions can also cause the one or more processors to configure a virtual cross connect (VXC) on a software-defined wide-area network (SDWAN) router associated with a software-defined cloud infrastructure (SDCI) provider, the VXC connecting the on-premises site to the cloud environment associated with the CSP. The instructions can also cause the one or more processors to assign border gateway protocol (BGP) parameters to the VXC. The instructions can also cause the one or more processors to configure BGP peering on a connectivity gateway in the cloud environment associated with the CSP. The instructions can also cause the one or more processors to connect the connectivity gateway to the at least one virtual network in the cloud environment. The instructions can also cause the one or more processors to tag the at least one virtual network with the tag. The instructions can also cause the one or more processors to configure a connection between the at least one routing domain in the on-premises site and the at least one virtual network in the cloud environment, wherein the connection is based at least in part on the tag.

An example non-transitory computer-readable storage medium having stored therein instructions which, when executed by a processor, cause the processor to receive a tag associating at least one routing domain in an on-premises site with at least one virtual network in a cloud environment associated with a cloud service provider (CSP). The instructions can also cause the processor to configure a virtual cross connect (VXC) on a software-defined wide-area network (SDWAN) router associated with a software-defined cloud infrastructure (SDCI) provider, the VXC connecting the on-premises site to the cloud environment associated with the CSP. The instructions can also cause the processor to assign border gateway protocol (BGP) parameters to the VXC. The instructions can also cause the processor to configure BGP peering on a connectivity gateway in the cloud environment associated with the CSP. The instructions can also cause the processor to connect the connectivity gateway to the at least one virtual network in the cloud environment. The instructions can also cause the processor to tag the at least one virtual network with the tag. The instructions can also cause the processor to configure a connection between the at least one routing domain in the on-premises site and the at least one virtual network in the cloud environment, wherein the connection is based at least in part on the tag.

Example Embodiments

This disclosure will first discuss examples of network architectures and topologies for software-defined wide-area networks (SD-WANs), as well as various overlays for such networks. Then, the disclosure will discuss example embodiments for automating connectivity to cloud resources. Finally, the disclosure will discuss an example computing system which can be used to execute the present technology.

FIG. 1 illustrates an example of a network architecture 100 for implementing aspects of the present technology. An example of an implementation of the network architecture 100 is the Cisco® SD-WAN architecture. However, one of ordinary skill in the art will understand that, for the network architecture 100 and any other system discussed in the present disclosure, there can be additional or fewer component in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure.

In this example, the network architecture 100 can comprise an orchestration plane 102, a management plane 120, a control plane 130, and a data plane 140. The orchestration plane 102 can assist in the automatic on-boarding of edge network devices 142 (e.g., switches, routers, etc.) in an overlay network. The orchestration plane 102 can include one or more physical or virtual network orchestrator appliances 104. The network orchestrator appliance(s) 104 can perform the initial authentication of the edge network devices 142 and orchestrate connectivity between devices of the control plane 130 and the data plane 140. In some embodiments, the network orchestrator appliance(s) 104 can also enable communication of devices located behind Network Address Translation (NAT). In some embodiments, physical or virtual Cisco® SD-WAN vBond appliances can operate as the network orchestrator appliance(s) 104.

The management plane 120 can be responsible for central configuration and monitoring of a network. The management plane 120 can include one or more physical or virtual network management appliances 122. In some embodiments, the network management appliance(s) 122 can provide centralized management of the network via a graphical user interface to enable a user to monitor, configure, and maintain the edge network devices 142 and links (e.g., Internet transport network 160, MPLS network 162, 4G/LTE network 164) in an underlay and overlay network. The network management appliance(s) 122 can support multi-tenancy and enable centralized management of logically isolated networks associated with different entities (e.g., enterprises, divisions within enterprises, groups within divisions, etc.). Alternatively or in addition, the network management appliance(s) 122 can be a dedicated network management system for a single entity. In some embodiments, physical or virtual Cisco® SD-WAN vManage appliances can operate as the network management appliance(s) 122. The management plane 120 can include an analytics engine 124 to provide analytics for the network.

The control plane 130 can build and maintain a network topology and make decisions on where traffic flows. The control plane 130 can include one or more physical or virtual network controller appliance(s) 132. The network controller appliance(s) 132 can establish secure connections to each network device 142 and distribute route and policy information via a control plane protocol (e.g., Overlay Management Protocol (OMP) (discussed in further detail below), Open Shortest Path First (OSPF), Intermediate System to Intermediate System (IS-IS), Border Gateway Protocol (BGP), Protocol-Independent Multicast (PIM), Internet Group Management Protocol (IGMP), Internet Control Message Protocol (ICMP), Address Resolution Protocol (ARP), Bidirectional Forwarding Detection (BFD), Link Aggregation Control Protocol (LACP), etc.). In some embodiments, the network controller appliance(s) 132 can operate as route reflectors. The network controller appliance(s) 132 can also orchestrate secure connectivity in the data plane 140 between and among the edge network devices 142. For example, in some embodiments, the network controller appliance(s) 132 can distribute crypto key information among the network device(s) 142. This can allow the network to support a secure network protocol or application (e.g., Internet Protocol Security (IPSec), Transport Layer Security (TLS), Secure Shell (SSH), etc.) without Internet Key Exchange (IKE) and enable scalability of the network. In some embodiments, physical or virtual Cisco® SD-WAN vSmart controllers can operate as the network controller appliance(s) 132.

The data plane 140 can be responsible for forwarding packets based on decisions from the control plane 130. The data plane 140 can include the edge network devices 142, which can be physical or virtual network devices. The edge network devices 142 can operate at the edges various network environments of an organization, such as in one or more data centers or colocation centers 150, campus networks 152, branch office networks 154, home office networks 154, and so forth, or in the cloud (e.g., Infrastructure as a Service (IaaS), Platform as a Service (PaaS), SaaS, and other cloud service provider networks). The edge network devices 142 can provide secure data plane connectivity among sites over one or more WAN transports, such as via one or more Internet transport networks 160 (e.g., Digital Subscriber Line (DSL), cable, etc.), MPLS networks 162 (or other private packet-switched network (e.g., Metro Ethernet, Frame Relay, Asynchronous Transfer Mode (ATM), etc.), mobile networks 164 (e.g., 3G, 4G/LTE, 5G, etc.), or other WAN technology (e.g., Synchronous Optical Networking (SONET), Synchronous Digital Hierarchy (SDH), Dense Wavelength Division Multiplexing (DWDM), or other fiber-optic technology; leased lines (e.g., T1/E1, T3/E3, etc.); Public Switched Telephone Network (PSTN), Integrated Services Digital Network (ISDN), or other private circuit-switched network; small aperture terminal (VSAT) or other satellite network; etc.). The edge network devices 142 can be responsible for traffic forwarding, security, encryption, quality of service (QOS), and routing (e.g., BGP, OSPF, etc.), among other tasks. In some embodiments, physical or virtual Cisco® SD-WAN vEdge routers can operate as the edge network devices 142.

Figure 2:
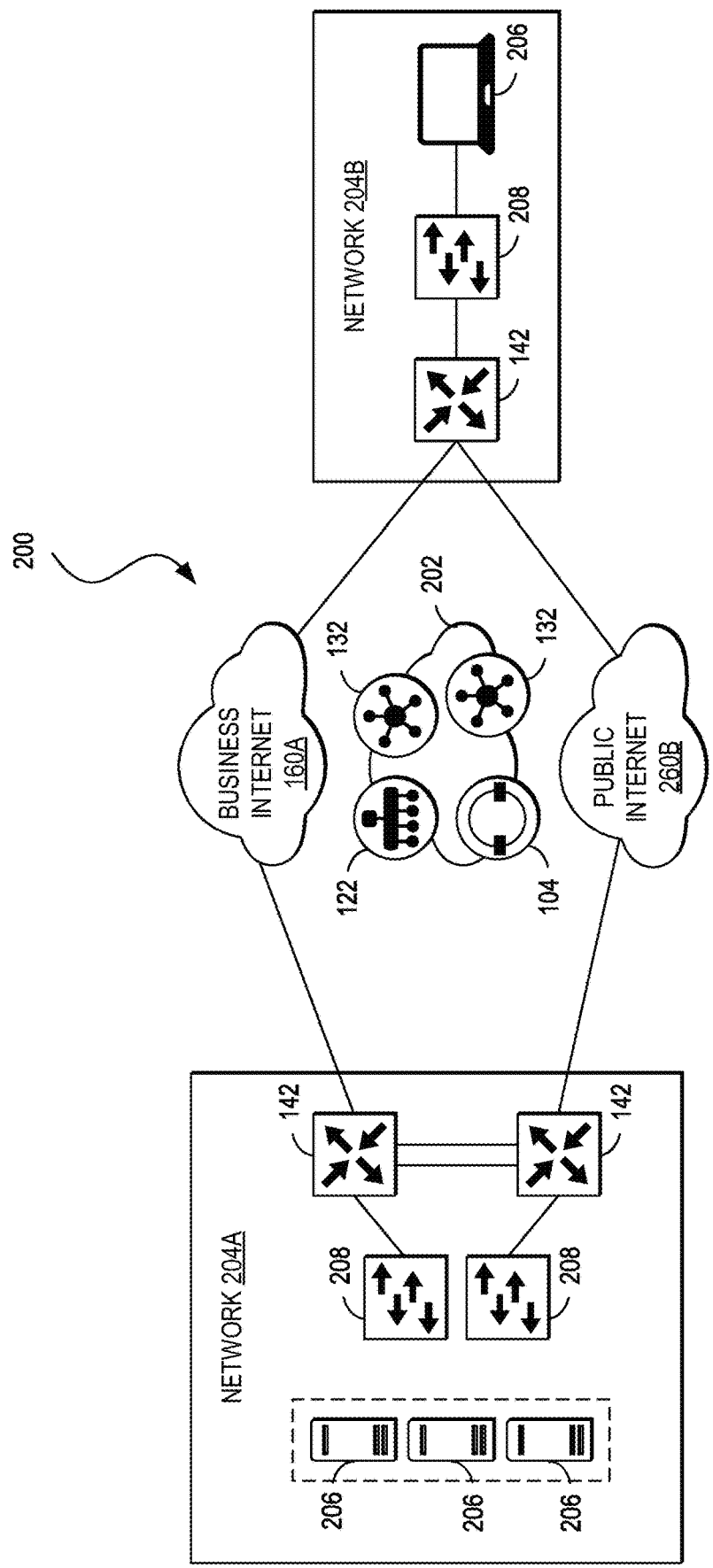
FIG. 2 illustrates an example of a network topology in accordance with some examples of the present disclosure.

FIG. 2 illustrates an example of a network topology 200 for showing various aspects of the network architecture 100. The network topology 200 can include a management network 202, a pair of network sites 204A and 204B (collectively, 204) (e.g., the data center(s) 150, the campus network(s) 152, the branch office network(s) 154, the home office network(s) 156, cloud service provider network(s), etc.), and a pair of Internet transport networks 160A and 160B (collectively, 160). The management network 202 can include one or more network orchestrator appliances 104, one or more network management appliance 122, and one or more network controller appliances 132. Although the management network 202 is shown as a single network in this example, one of ordinary skill in the art will understand that each element of the management network 202 can be distributed across any number of networks and/or be co-located with the sites 204. In this example, each element of the management network 202 can be reached through either transport network 160A or 160B.

Each site can include one or more endpoints 206 connected to one or more site network devices 208. The endpoints 206 can include general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), car devices, etc.), and so forth. The endpoints 206 can also include Internet of Things (IoT) devices or equipment, such as agricultural equipment (e.g., livestock tracking and management systems, watering devices, unmanned aerial vehicles (UAVs), etc.); connected cars and other vehicles; smart home sensors and devices (e.g., alarm systems, security cameras, lighting, appliances, media players, HVAC equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

The site network devices 208 can include physical or virtual switches, routers, and other network devices. Although the site 204A is shown including a pair of site network devices and the site 204B is shown including a single site network device in this example, the site network devices 208 can comprise any number of network devices in any network topology, including multi-tier (e.g., core, distribution, and access tiers), spine-and-leaf, mesh, tree, bus, hub and spoke, and so forth. For example, in some embodiments, one or more data center networks may implement the Cisco® Application Centric Infrastructure (ACI) architecture and/or one or more campus networks may implement the Cisco® Software Defined Access (SD-Access or SDA) architecture. The site network devices 208 can connect the endpoints 206 to one or more edge network devices 142, and the edge network devices 142 can be used to directly connect to the transport networks 160.

In some embodiments, "color" can be used to identify an individual WAN transport network, and different WAN transport networks may be assigned different colors (e.g., mpls, private1, biz-internet, metro-ethernet, lte, etc.). In this example, the network topology 200 can utilize a color called "biz-internet" for the Internet transport network 160A and a color called "public-internet" for the Internet transport network 160B.

In some embodiments, each edge network device 208 can form a Datagram Transport Layer Security (DTLS) or TLS control connection to the network controller appliance(s) 132 and connect to any network control appliance 132 over each transport network 160. In some embodiments, the edge network devices 142 can also securely connect to edge network devices in other sites via IPSec tunnels. In some embodiments, the BFD protocol may be used within each of these tunnels to detect loss, latency, jitter, and path failures.

On the edge network devices 142, color can be used help to identify or distinguish an individual WAN transport tunnel (e.g., no same color may be used twice on a single edge network device). Colors by themselves can also have significance. For example, the colors metro-ethernet, mpls, and private 1, private2, private3, private4, private5, and private6 may be considered private colors, which can be used for private networks or in places where there is no NAT addressing of the transport IP endpoints (e.g., because there may be no NAT between two endpoints of the same color). When the edge network devices 142 use a private color, they may attempt to build IPSec tunnels to other edge network devices using native, private, underlay IP addresses. The public colors can include 3g, biz, internet, blue, bronze, custom1, custom2, custom3, default, gold, green, lte, public-internet, red, and silver. The public colors may be used by the edge network devices 142 to build tunnels to post-NAT IP addresses (if there is NAT involved). If the edge network devices 142 use private colors and need NAT to communicate to other private colors, the carrier setting in the configuration can dictate whether the edge network devices 142 use private or public IP addresses. Using this setting, two private colors can establish a session when one or both are using NAT.

Figure 3:
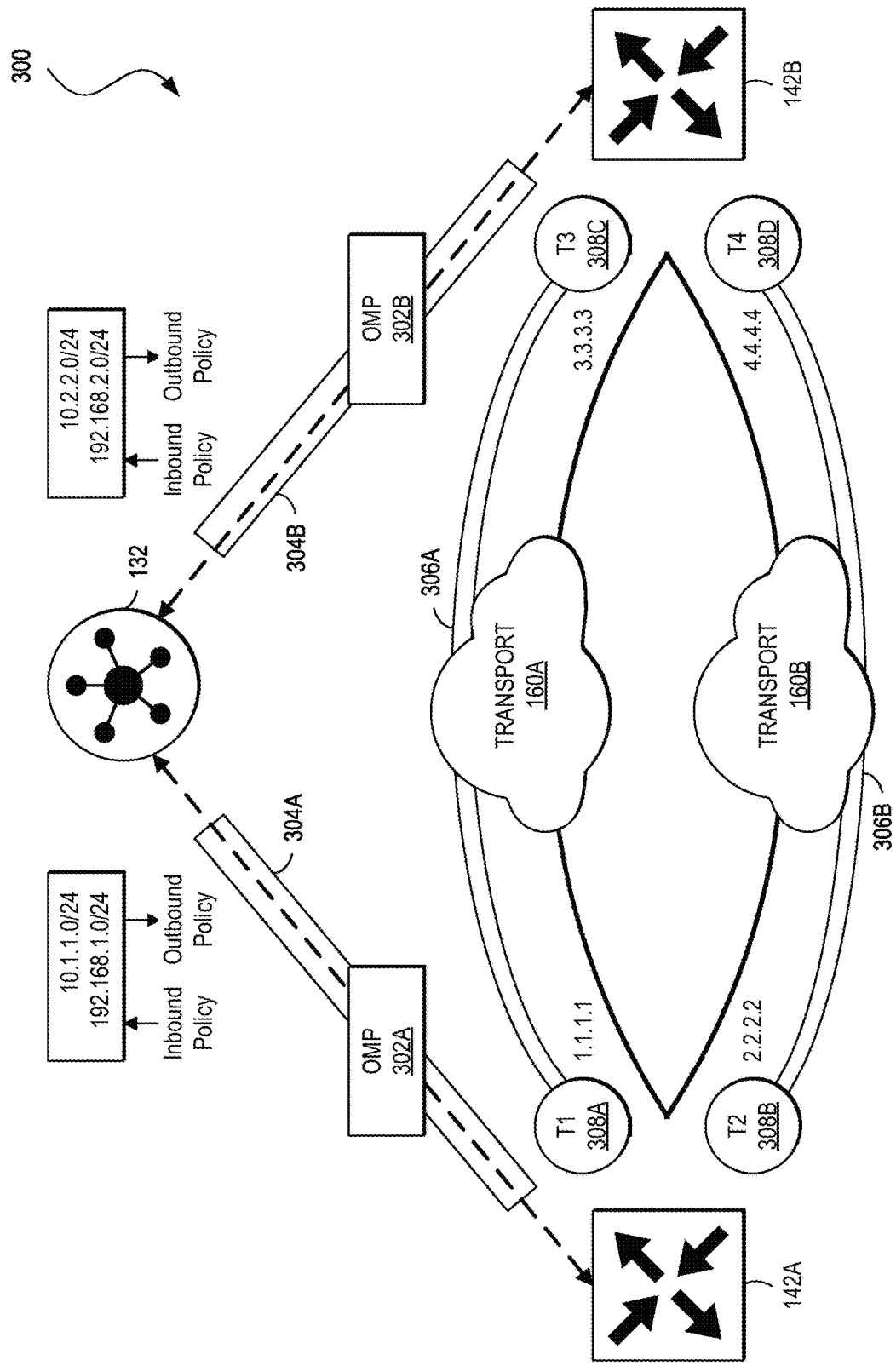
FIG. 3 illustrates an example of a diagram showing the operation of a protocol for managing an overlay network in accordance with some examples of the present disclosure.

FIG. 3 illustrates an example of a diagram 300 showing the operation of OMP, which may be used in some embodiments to manage an overlay of a network (e.g., the network architecture 100). In this example, OMP messages 302A and 302B (collectively, 302) may be transmitted back and forth between the network controller appliance 132 and the edge network devices 142A and 142B, respectively, where control plane information, such as route prefixes, next-hop routes, crypto keys, policy information, and so forth, can be exchanged over respective secure DTLS or TLS connections 304A and 304B. The network controller appliance 132 can operate similarly to a route reflector. For example, the network controller appliance 132 can receive routes from the edge network devices 142, process and apply any policies to them, and advertise routes to other edge network devices 142 in the overlay. If there is no policy defined, the edge network devices 142 may behave in a manner similar to a full mesh topology, where each edge network device 142 can connect directly to another edge network device 142 at another site and receive full routing information from each site.

OMP can advertise various types of routes. For example, OMP can advertise OMP routes, which can correspond to prefixes that are learned from the local site, or service side, of the edge network device 142. The prefixes can be originated as static or connected routes, or from within, for example, the OSPF or BGP protocols, and redistributed into OMP so they can be carried across the overlay. OMP routes can advertise attributes such as transport location (TLOC) information (which can similar to a BGP next-hop IP address) and other attributes such as origin, originator, preference, site identifier, tag, and virtual private network (VPN). An OMP route may be installed in the forwarding table if the TLOC to which it points is active.

As another example, OMP can advertise TLOC routes, which can correspond to logical tunnel termination points on the edge network devices 142 that connect into the transport networks 160. In some embodiments, a TLOC route can be uniquely identified and represented by a three-tuple, including an IP address, link color, and encapsulation (e.g., Generic Routing Encapsulation (GRE), IPSec, etc.). In addition to system IP address, color, and encapsulation, TLOC routes can also carry attributes such as TLOC private and public IP addresses, carrier, preference, site identifier, tag, and weight. In some embodiments, a TLOC may be in an active state on a particular edge network device 142 when an active BFD session is associated with that TLOC.

As another example, OMP can advertise service routes, which can represent services (e.g., firewall, distributed denial of service (DDoS) mitigator, load balancer, intrusion prevent system (IPS), intrusion detection systems (IDS), WAN optimizer, etc.) that may be connected to the local sites of the edge network devices 142 and accessible to other sites for use with service insertion. In addition, these routes can also include VPNs; the VPN labels can be sent in an update type to tell the network controller appliance 132 what VPNs are serviced at a remote site.

In the example of FIG. 3, OMP is shown running over the DTLS/TLS tunnels 304 established between the edge network devices 142 and the network controller appliance 132. In addition, the diagram 300 shows an IPSec tunnel 306A established between TLOC 308A and 308C over the WAN transport network 160A and an IPSec tunnel 306B established between TLOC 308B and TLOC 308D over the WAN transport network 160B. Once the IPSec tunnels 306A and 306B are established, BFD can be enabled across each of them.

Figure 4:
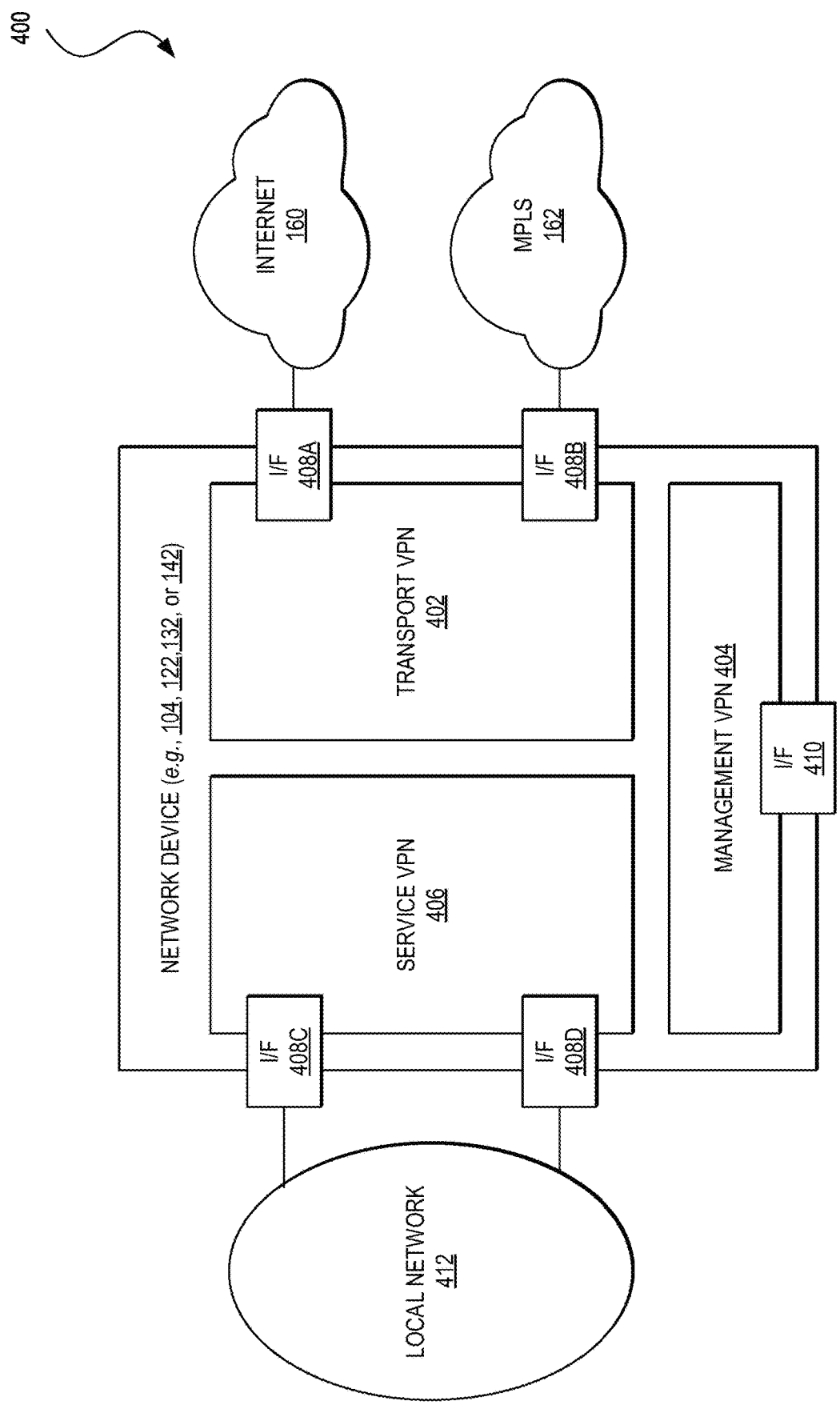
FIG. 4 illustrates an example of a diagram showing the operation of virtual private networks for segmenting a network in accordance with some examples of the present disclosure.

FIG. 4 illustrates an example of a diagram 400 showing the operation of VPNs, which may be used in some embodiments to provide segmentation for a network (e.g., the network architecture 100). VPNs can be isolated from one another and can have their own forwarding tables. An interface or sub-interface can be explicitly configured under a single VPN and may not be part of more than one VPN. Labels may be used in OMP route attributes and in the packet encapsulation, which can identify the VPN to which a packet belongs. The VPN number can be a four-byte integer with a value from 0 to 65530. In some embodiments, the network orchestrator appliance(s) 104, network management appliance(s) 122, network controller appliance(s) 132, and/or edge network device(s) 142 can each include a transport VPN 402 (e.g., VPN number 0) and a management VPN 404 (e.g., VPN number 512). The transport VPN 402 can include one or more physical or virtual network interfaces (e.g., network interfaces 410A and 410B) that respectively connect to WAN transport networks (e.g., the MPLS network 162 and the Internet transport network 160). Secure DTLS/TLS connections to the network controller appliance(s) 132 or between the network controller appliance(s) 132 and the network orchestrator appliance(s) 104 can be initiated from the transport VPN 402. In addition, static or default routes or a dynamic routing protocol can be configured inside the transport VPN 402 to get appropriate next-hop information so that the control plane 130 may be established and IPSec tunnels 306 (not shown) can connect to remote sites.

The management VPN 404 can carry out-of-band management traffic to and from the network orchestrator appliance(s) 104, network management appliance(s) 122, network controller appliance(s) 132, and/or edge network device(s) 142 over a network interface 410C. In some embodiments, the management VPN 404 may not be carried across the overlay network.

In addition to the transport VPN 402 and the management VPN 404, the network orchestrator appliance(s) 104, network management appliance(s) 122, network controller appliance(s) 132, or edge network device(s) 142 can also include one or more service-side VPNs 406. The service-side VPN 406 can include one or more physical or virtual network interfaces (e.g., network interfaces 410D and 410E) that connect to one or more local-site networks 412 and carry user data traffic. The service-side VPN(s) 406 can be enabled for features such as OSPF or BGP, Virtual Router Redundancy Protocol (VRRP), QOS, traffic shaping, policing, and so forth. In some embodiments, user traffic can be directed over IPSec tunnels to other sites by redistributing OMP routes received from the network controller appliance(s) 132 at the site 412 into the service-side VPN routing protocol. In turn, routes from the local site 412 can be advertised to other sites by advertising the service VPN routes into the OMP routing protocol, which can be sent to the network controller appliance(s) 132 and redistributed to other edge network devices 142 in the network. Although the network interfaces 410A-E (collectively, 410) are shown to be physical interfaces in this example, one of ordinary skill in the art will appreciate that the interfaces 410 in the transport and service VPNs can also be sub-interfaces instead.

Now the disclosure turns to discussing examples for automating connectivity to cloud resources. The present technology can utilize the tools available in SDWAN networks, as described in FIGS. 1-4, to automate intent-driven connectivity from on-premises network segments to cloud resources. By automatically and dynamically mapping on-premises network segments to cloud resources, workload on network administrators can be reduced, high uptime can be preserved, and service-level agreements throughout the connectivity chain can be preserved. This fills a need in the art by dynamically mapping cloud resources to network segments of network sites such as on-premises networks.

Figure 5:
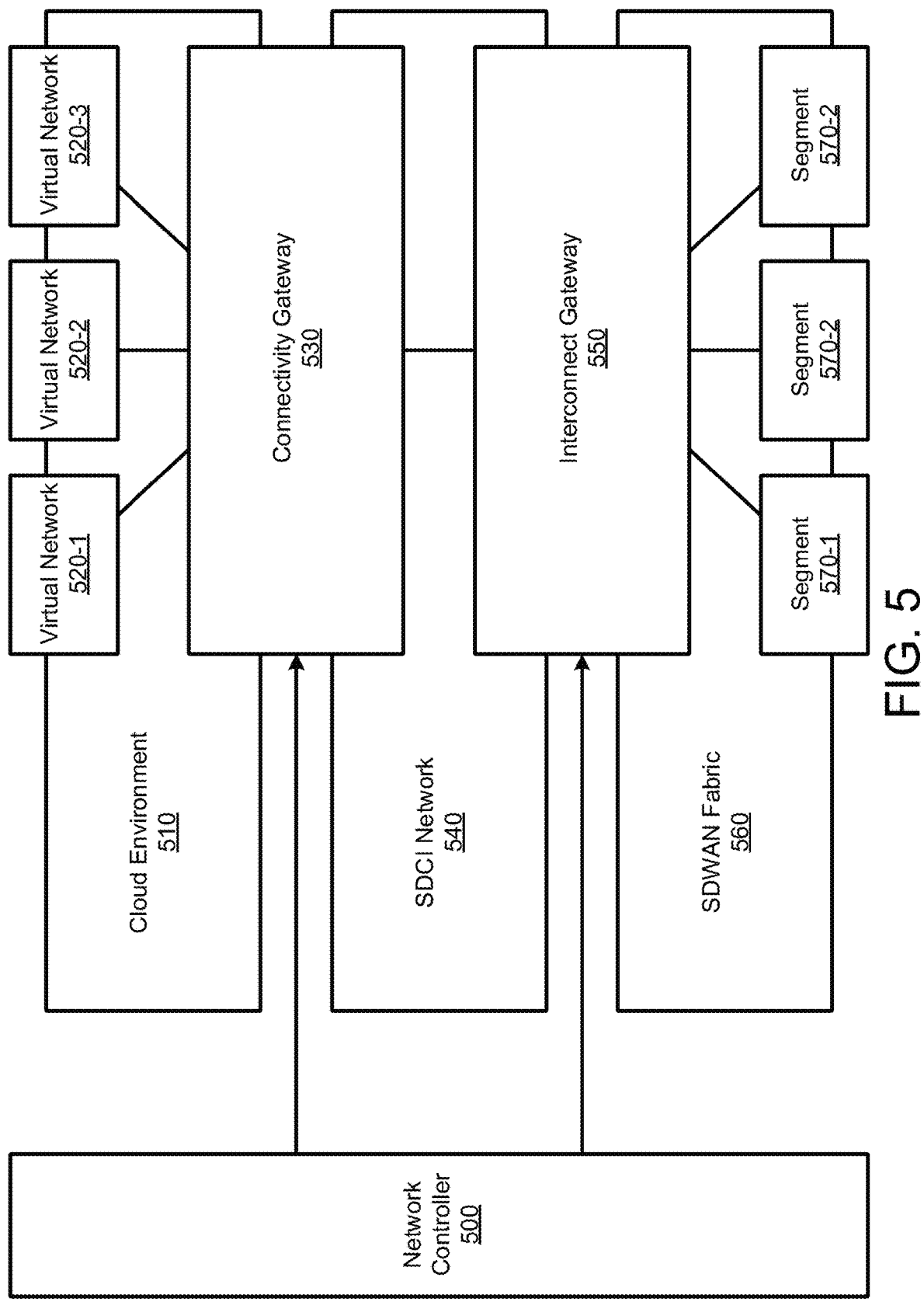
FIG. 5 illustrates an example of a network capable of automating connectivity to cloud resources in accordance with some examples of the present disclosure.

FIG. 5 illustrates an example of a network capable of automating connectivity to cloud resources. Network controller 500 can send requests to connectivity gateway 530 and interconnect gateway 550 that connect any of segments 570-1, 570-2, or 570-3 to any of virtual networks 520-1, 520-2, or 520-3.

Network controller 500 can be a network controller similar to network controller appliance(s) 132 illustrated in FIG. 1. For example, network controller 500 can be a controller utilizing CISCO vManage. Network controller 500 can send requests and configurations to connectivity gateway 530 and interconnect gateway 550. For example, a configuration sent to interconnect gateway 550 can include a configuration to establish a border gateway protocol (BGP), a configuration for a network segment, or a configuration for a sub-interface based on VLAN.

SDWAN fabric 560 can be a network similar to data center 150, campus 152, branch office 154, or home office 156 illustrated in FIG. 1 or networks 204A and 204B illustrated in FIG. 2. SDWAN fabric 560 can be an on-premises network containing segments 570-1, 570-2, and 570-3 (collectively segments 570). For example, segments 570 can be virtual routing functions.

SDCI network 540 can be a software-defined cloud infrastructure (SDCI) network. SDCI network 540 can be similar to data center 150, campus 152, branch office 154, or home office 156 illustrated in FIG. 1 or networks 204A and 204B illustrated in FIG. 2. SDCI network 540 can act as an intermediary network between SDWAN fabric 560 and cloud environment 510.

Cloud environment 510 can be a network similar to networks 204A and 204B illustrated in FIG. 2. Cloud environment 510 can contain virtual networks 520-1, 520-2, and 520-3 (collectively "virtual networks 520" hereinafter).

Interconnect gateway 550 and connectivity gateway 530 can be routers or network edges. Interconnect gateway 550 can connect SDWAN fabric 560 to SDCI network 540. Connectivity gateway 530 can connect SDCI network 540 to cloud environment 510.

For example, cloud environment 510 can be Amazon Web Services, virtual networks 520 can be virtual private clouds, and connectivity gateway 530 can be a direct connect gateway. In another example, cloud environment 510 can be Google Cloud, virtual networks 520 can be virtual private clouds, and connectivity gateway 530 can be a Google cloud router.

Network controller 500 can setup connectivity between a segment 570 and a virtual network 520. This connectivity can be enabled by tags received by network controller 500 indicating that a connection between a segment 570 and a virtual network 520 should be established. For example, the tags can map or associate a segment (e.g., a virtual network, a routing domain, a prefix, a subnet, etc.) of the SDWAN fabric 560 to a virtual network (e.g., a virtual private network or routing domain, etc.) in the cloud environment 510, which can be used to establish connectivity between the segment in the SDWAN fabric 560 and the virtual network in the cloud environment 510. In some examples, a tag can associated a segment(s) and a virtual network based on one or more factors such as, for example and without limitation, a common attribute (e.g., a common service or functionality, a common set of associated users/groups/devices, a common security group or policy, a common set of requirements, etc.), a relationship, a preference, etc. These tags can be received from a network administrator, an automated process, or via other means.

To achieve connectivity between a segment 570 and a virtual network 520, network controller can send requests and configurations to interconnect gateway 550 and connectivity gateway 530. Network controller 500 can establish connectivity between interconnect gateway 550 and connectivity gateway 530 and between connectivity gateway 530 and a virtual network 520. Taken together, network controller 500 can establish connectivity between a segment 570 and a virtual network 520, as a segment 570 is already connected to interconnect gateway 550.

Network controller 500 can establish connectivity between interconnect gateway 550 and connectivity gateway 530. In some examples, this connectivity can be a virtual cross connect (VXC). A VXC is a layer 2 connection, or data link layer connection, originating in interconnect gateway 550 and extending to connectivity gateway 530.

Network controller 500 can build the VXC and send it to interconnect gateway 550 on SDCI network 540. Below is an example of code for building a VXC on interconnect gateway 550, which network controller 500 can send to interconnect gateway 550:

```
a_end = { }
a_end['vlan'] = 0
a_end['innerVlan'] = 0
b_end = { }
b_end['productUid'] = destinationProductId # Partner port Location Id
b_end['vlan'] = 0
b_end['innerVlan'] = 0
cloud_vxc_req['productUid'] = sourceProductId # MVE Product Id
associated_vxcs = { }
associated_vxcs['productName'] = connectivityName # Name of the connection
associated_vxcs['rateLimit'] = connectivitySpeed # Speed of the connection
associated_vxcs['aEnd'] = a_end
associated_vxcs['bEnd'] = b_end
associated_vxcs_array = [ ]
associated_vxcs_array.append(associated_vxcs)
cloud_vxc_req['associatedVxcs'] = associated_vxcs_array
create_vxc_array = [ ]
create_vxc_array.append(cloud_vxc_req)
```

Once interconnect gateway 550 has received the VXC, SDCI network 540 can validate the VXC creation request. A network administrator operating network controller 500 can validate the request, or the request can be validated in an automated manner, or via other means.

Network controller 500 can establish connectivity between interconnect gateway 550 and virtual network(s) 520 via connectivity gateway 530. Virtual networks 520 can be specified by the tag received by network controller 500.

Network controller 500 can invoke an API to request connectivity gateway 530 to accept a virtual interface for SDCI network 540. For example, when cloud environment 510 is Amazon Web Services, the virtual interface can be a private or transit virtual interface. In another example, when cloud environment 510 is Google Cloud, the virtual interface can be a partner interconnect. Below is an example of code for asking connectivity gateway 530 to accept a virtual interface for SDCI network 540, which network controller 500 can send to connectivity gateway 530:

```
response = self.get_dc_client( ).confirm_private_virtual_interface(virtualInterfaceId=vif_id,
    directConnectGatewayId=dcg_id)
```

Using this virtual interface, network controller 500 can map virtual networks specified in the tag to the set of virtual networks 520. For example, to achieve this when cloud environment 510 is Amazon Web Services, for each virtual network 520, network controller 500 can:

1) Create a virtual private gateway and attach it to virtual network 520:

```
response = self.get_ec2_client( ).create_vpn_gateway(Type=vpg_type,
    AmazonSide.Asn=asn,
    DryRun=False)
response = self.get_ec2_client( ).attach_vpn_gateway(VpcId=vpc_id,
    VpnGatewayId=vpg_id)
```

2) Save an existing routing table for virtual network 520 and create a new routing table for virtual network 520:

```
# Build the tag specifications.
tag_list = [ { 'Key': route_table_fields['name'], 'Value': name } ]
tag_specifications = [
{
'ResourceType': 'route-table',
'Tags': tag_list,
}
]
response = self.get_ec2_client( ).create_route_table(VpcId=vpc_id,
    TagSpecifications=tag_specifications)
```

3) Add a default route to the new routing table pointing to the virtual private gateway:

```
ret_code = self.get_ec2_client( ).create_route(DestinationCidrBlock=cidr_block,
GatewayId=gw_id,
RouteTableId=route_table_id)
response =
self.get_ec2_client( ).replace_route_table_association(AssociationId=old_association_id,
RouteTableId=new_route_table_id)
```

4) Associate the virtual private gateway with connectivity gateway 530, where the advertised prefix list is set to the address prefix for virtual network 520:

```
response =
self.get_dc_client( ).create_direct_connect_gateway_association(directConnectGatewayId=dcg_i
d,
gatewayId=gw_id,
addAllowedPrefixesToDirectConnectGateway=advertised_prefix_list)
```

In some cases, to complete the connection from segment 570 to virtual network 520, network controller 500 can push configurations to interconnect gateway 550. Network controller 500 can configure border gateway protocol (BGP) peering between interconnect gateway 550 and virtual network 520. Network connection 500 can push various configurations to interconnect gateway 550 to establish BGP peering, including:

1) BGP peering configurations:

```
vrf definition 10
    rd 1:1
    address-family ipv4
```

-continued

```
route-target export 65000:1
route-target import 65000:1
exit-address-family
!
address-family ipv6
exit-address-family
!
!
```

2) Segment configurations:

```
interface GigabitEthernet1.2936
   no shutdown
   encapsulation dot1Q 2936
   vrf forwarding 10
   ip address 192.168.0.29 255.255.255.252
   ip mtu 1496
exit
```

3) Virtual network sub-interface configurations

```
router bgp 65000
   bgp log-neighbor-changes
   address-family ipv4 unicast vrf 10
   distance bgp 20 200 20
   neighbor 192.168.0.30 remote-as 64515
   neighbor 192.168.0.30 activate
   neighbor 192.168.0.30 activate
   neighbor 192.168.0.30 description test-tgw-asn
   neighbor 192.168.0.30 ebgp-multihop
   neighbor 192.168.0.30 password 0 ECLZMN8MSXGDV65IZGM5
   neighbor 192.168.0.30 send-community both
   redistribute omp
   exit-address-family
   !
   timers bgp 60 180
!
```

In some examples, a tag governing connections between SDWAN fabric 560 and cloud environment 510 can be updated. Network controller 500 can automatically discover connections affected by the tag as well as endpoints in segments 570 and virtual networks 520 and apply the tag changes accordingly. For example, when cloud environment 510 is Amazon Web Services, network controller 500 can attach a new virtual cloud gateway to the affected virtual networks 520 and connectivity gateway 530, and update the routing table for virtual networks 520.

Figure 6A:
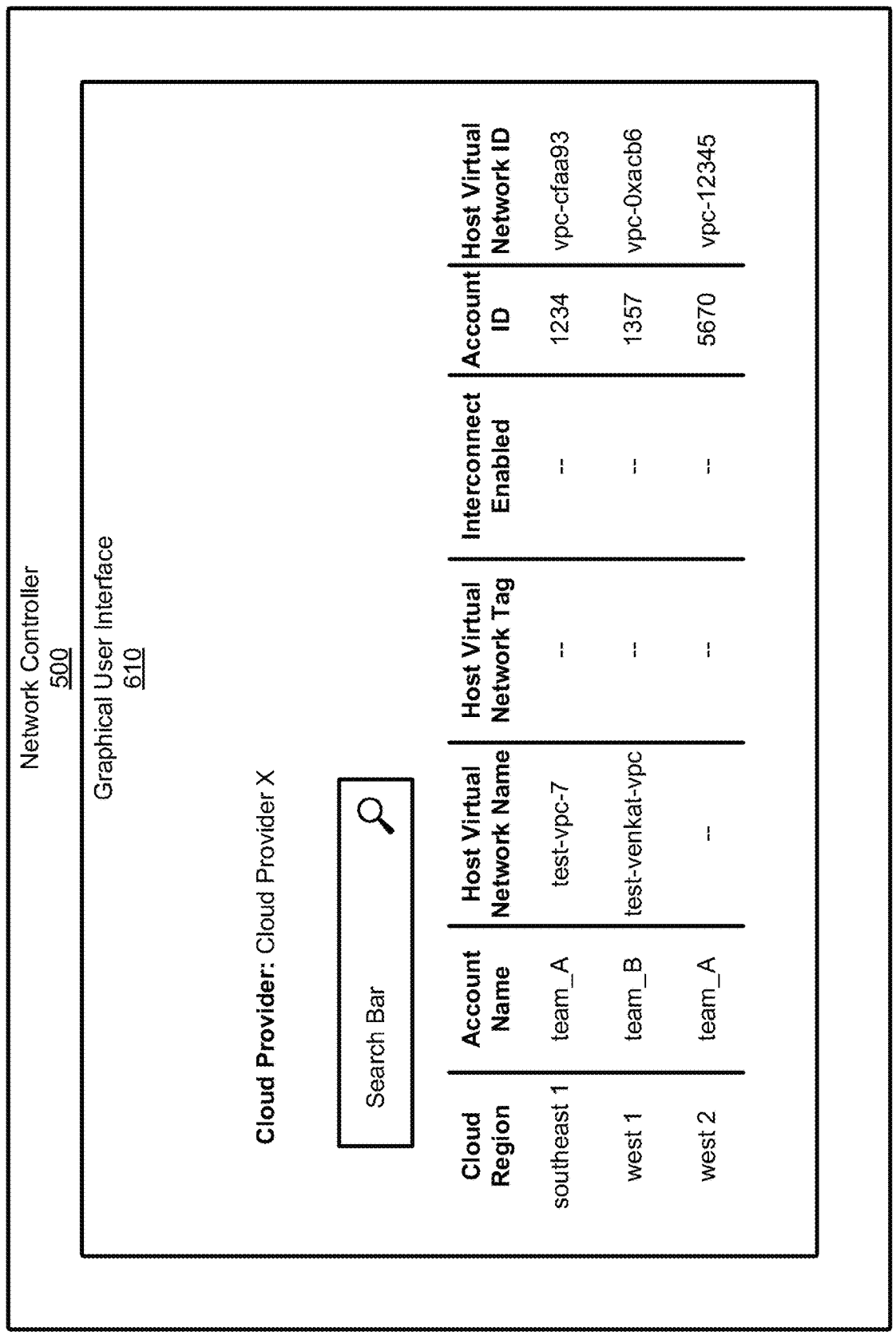

FIGS. 6A-6C illustrate examples of graphical user interfaces (GUIs) for network controller 500 as illustrated in FIG. 5. Through these GUIs, a network administrator can discover virtual networks 520, add tags to virtual networks 520, or edit tags for virtual networks 520.

FIG. 6A illustrates a GUI 610 for discovering virtual networks 520. After cloud environment 510 is associated with network controller 500, network controller 500 can sync all virtual networks 520 from respective accounts and display them. GUI 610 can display information such as the name of cloud environment 510, and for each virtual network 520 can display cloud region, account name, the host virtual network name, the host virtual network tab, whether the virtual network is interconnect enabled, the account ID, and the host virtual network ID. A network administrator can, using GUI 610, select multiple virtual networks 520 across multiple cloud environments 510 and group them as a single logical group known as a tag. This tag acts as single control point for all virtual networks 520 associated with the tag.

FIG. 6B illustrates a GUI 620 for creating a tag. A network administrator can specify a tag name and select virtual networks 520 in a given region. The network administrator can choose whether to enable interconnect connectivity for the new tag. A tag, once created, can be associated to a connection as part of an interconnect connection creation to establish connectivity from segments 570 to virtual networks 520.

FIG. 6C illustrates a GUI 630 for editing a tag. A network administrator can modify the composition of already-deployed tags at a later point to update virtual networks 520 associated with the tags. If such a modification is made, network controller 500 can detect and adjust the connectivity accordingly.

FIG. 7 illustrates an example method 700 for automating connectivity to cloud resources. Although the example method 700 depicts a particular sequence of operations, the sequence may be altered without departing from the scope of the present disclosure. For example, some of the operations depicted may be performed in parallel or in a different sequence that does not materially affect the function of the method 700. In other examples, different components of an example device or system that implements the method 700 may perform functions at substantially the same time or in a specific sequence.

At block 710, the method 700 includes receiving a tag associating at least one routing domain in an on-premises site with at least one virtual network in a cloud environment associated with a cloud service provider (CSP). For example, network controller 500 illustrated in FIG. 5 may receive a tag associating at least one routing domain in an on-premises site with at least one virtual network in a cloud environment associated with a CSP.

At block 720, the method 700 includes configuring a virtual cross connect (VXC) on a software-defined wide-area network (SDWAN) router associated with a software-defined cloud infrastructure provider (SDCI), the VXC connecting the on-premises site to the cloud environment associated with the CSP. For example, network controller 500 illustrated in FIG. 5 may establish a VXC on an SDWAN router associated with an SDCI provider, the VXC connecting the on-premises site to the cloud environment associated with the CSP.

At block 730, the method 700 includes assigning border gateway protocol (BGP) parameters to the VXC. For example, network controller 500 illustrated in FIG. 5 may assign BGP parameters to the VXC.

At block 740, the method 700 includes configuring BGP peering on a connectivity gateway in the cloud environment associated with the CSP. For example, network controller 500 illustrated in FIG. 5 may configure BGP peering on a connectivity gateway in the cloud environment associated with the CSP.

At block 750, the method 700 includes connecting the connectivity gateway to the at least one virtual network in the cloud environment. For example, network controller 500 illustrated in FIG. 5 may connect the connectivity gateway to the at least one virtual network in the cloud environment.

In another example of connecting the connectivity gateway to the at least one virtual network in the cloud environment at block 750, the method 700 can include invoking an API to use an interface associated with the SDCI provider. Further, the method 700 can include using the interface to connect to the connectivity gateway. Further, the method 700 can include mapping the tag to the at least one virtual network.

In another example of the mapping the tag, the method 700 can include attaching a cloud gateway to the at least one virtual network in the cloud environment. Further, the method 700 can include saving an existing routing table for the at least one virtual network. Further, the method 700 can include creating a new routing table for the at least one virtual network. Further, the method 700 can include adding, to the new routing table, a default route pointing to the cloud gateway. Further, the method 700 can include enabling route propagation based on the new routing table. Further, the method 700 can include associating the cloud gateway to the connectivity gateway. In some examples, an advertised prefix list is set to an address prefix for the at least one virtual network.

At block 760, the method 700 includes tagging the at least one virtual network with the tag. For example, network controller 500 illustrated in FIG. 5 may tag the at least one virtual network with the tag.

At block 770, the method 700 includes establishing a connection between the at least one routing domain in the on-premises site and the at least one virtual network in the cloud environment. For example, network controller 500 illustrated in FIG. 5 may establish a connection between the at least one routing domain in the on-premises site and the at least one virtual network in the cloud environment. In some examples, the connection is based at least in part on the tag.

In another example of the establishing a connection at block 770, the method 700 can include providing a BGP configuration to the SDWAN router. Further, the method 700 can include providing a segment configuration to the SDWAN router. Further, the method 700 can include providing a sub-interface configuration to the SDWAN router based on a virtual local area network.

In some embodiments, the method 700 can also include updating the tag. For example, network controller 500 illustrated in FIG. 5 can update the tag. Further, the method 700 can include automatically discovering connections affected by the tag. Further, the method 700 can include automatically discovering one or more virtual networks on the cloud environment affected by the tag. Further, the method 700 can include attaching a new cloud gateway to the one or more virtual networks affected by the tag. In some examples, updating the tag includes adding one or more new Virtual networks corresponding to the one or more virtual networks to the tag.

In some embodiments, the method 700 can also include updating an existing routing table for the one or more virtual networks affected by the tag. For example, network controller 500 illustrated in FIG. 5 can update an existing routing table for the one or more virtual networks affected by the tag. Further, the method 700 can include enabling route propagation based on the existing routing table. Further, the method 700 can include attaching the new cloud gateway to an affected connectivity gateway belonging to the connections affected by the tag and the one or more virtual networks affected by the tag.

Figure 8:
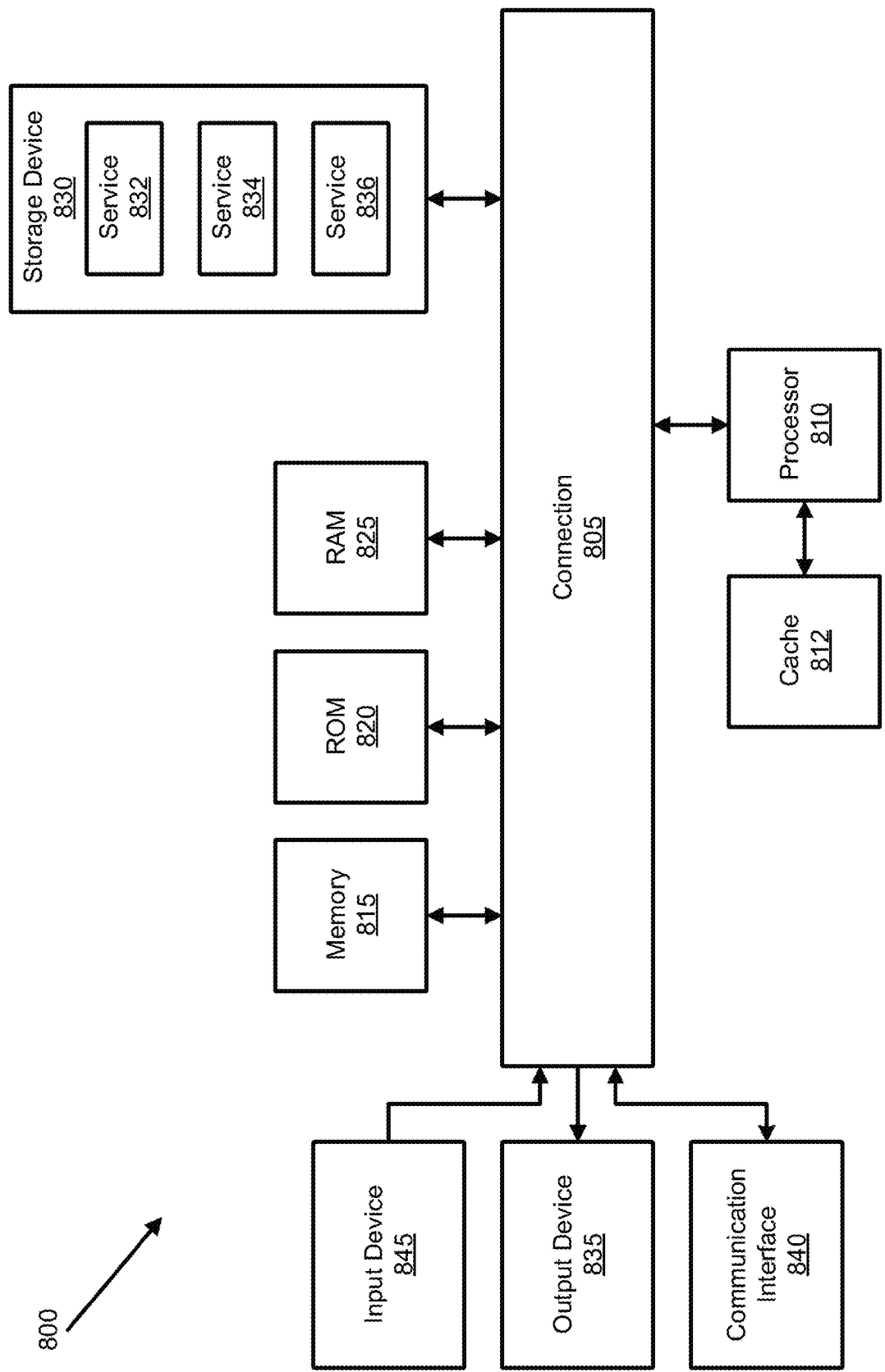
FIG. 8 shows an example of a system for implementing certain aspects of the present technology.

FIG. 8 shows an example of computing system 800, which can be for example any computing device making up network controller 500 or any component thereof in which the components of the system are in communication with each other using connection 805. Connection 805 can be a physical connection via a bus, or a direct connection into processor 810, such as in a chipset architecture. Connection 805 can also be a virtual connection, networked connection, or logical connection.

In some embodiments, computing system 800 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 800 includes at least one processing unit (CPU or processor) 810 and connection 805 that couples various system components including system memory 815, such as read-only memory (ROM) 820 and random access memory (RAM) 825 to processor 810. Computing system 800 can include a cache of high-speed memory 812 connected directly with, in close proximity to, or integrated as part of processor 810.

Processor 810 can include any general purpose processor and a hardware service or software service, such as services 832, 834, and 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction, computing system 800 includes an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms known to those of skill in the art. In some instances, multimodal systems can enable a user to provide multiple types of input/output to communicate with computing system 800. Computing system 800 can include communications interface 840, which can generally govern and manage the user input and system output. There is no restriction on operating on any particular hardware arrangement, and therefore the basic features here may easily be substituted for improved hardware or firmware arrangements as they are developed.

Storage device 830 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 830 can include software services, servers, services, etc., that when the code that defines such software is executed by the processor 810, it causes the system to perform a function. In some embodiments, a hardware service that performs a particular function can include the software component stored in a computer-readable medium in connection with the necessary hardware components, such as processor 810, connection 805, output device 835, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per sc.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

What is claimed is:

1. A method comprising:
   receiving configuration information associating at least one network segment of an enterprise network site with at least one virtual network in a cloud environment associated with a cloud service provider (CSP);
   configuring a software-defined wide-area network (SD-WAN) router associated with a software-defined cloud infrastructure (SDCI) provider with virtual cross connect data establishing a virtual cross connect, the virtual cross connect data connecting the enterprise network site to the cloud environment associated with the CSP;
   connecting a connectivity gateway in the cloud environment associated with the CSP to the at least one virtual network in the cloud environment; and
   configuring a connection between the at least one network segment of the enterprise network site and the at least one virtual network in the cloud environment through the connectivity gateway, wherein the connection is based at least in part on the configuration information.

2. The method of claim 1 further comprising causing the connectivity gateway of the CSP to create a virtual interface of the SDCI.

3. The method of claim 1 wherein the configuration information further comprises a connection speed associated with the connection between the at least one network segment of the enterprise network site and the at least one virtual network in the cloud environment.

4. The method of claim 1 wherein the configuration information further comprises one or more virtual local area network (VLAN) identifiers associated with a network interface of the enterprise network site.

5. The method of claim 1 wherein connecting the connectivity gateway to the at least one virtual network comprises:
   invoking an API to use an interface associated with the SDCI provider;
   using the interface to connect to the connectivity gateway; and
   mapping a tag to the at least one virtual network.

6. The method of claim 1 wherein the connection between the at least one network segment of the enterprise network site and the at least one virtual network in the cloud environment comprises:
   providing a border gateway protocol configuration to the SDWAN router.

7. The method of claim 1 further comprising:
   receiving updated configuration information;
   automatically discovering connections affected by the updated configuration information;
   automatically discovering one or more virtual networks on the cloud environment affected by the updated configuration information; and
   attaching a new cloud gateway to the one or more virtual networks affected by the updated configuration information.

8. A system comprising:
   one or more processors; and
   at least one computer-readable storage medium storing instructions which, when executed by the one or more processors, cause the one or more processors to perform operations, the operations comprising:
      receiving configuration information associating at least one network segment of an enterprise network site with at least one virtual network in a cloud environment associated with a cloud service provider (CSP);
      configuring a software-defined wide-area network (SD-WAN) router associated with a software-defined cloud infrastructure (SDCI) provider with virtual cross connect data establishing a virtual cross connect, the virtual cross connect data connecting the enterprise network site to the cloud environment associated with the CSP;
      connecting a connectivity gateway in the cloud environment associated with the CSP to the at least one virtual network in the cloud environment; and
      configuring a connection between the at least one network segment of the enterprise network site and the at least one virtual network in the cloud environment through the connectivity gateway, wherein the connection is based at least in part on the configuration information.

9. The system of claim 8, further comprising causing the connectivity gateway of the CSP to create a virtual interface of the SDCI.

10. The system of claim 8, wherein the configuration information further comprises a connection speed associated with the connection between the at least one network segment of the enterprise network site and the at least one virtual network in the cloud environment.

11. The system of claim 8, wherein the configuration information further comprises one or more virtual local area network (VLAN) identifiers associated with a network interface of the enterprise network site.

12. The system of claim 8, wherein connecting the connectivity gateway to the at least one virtual network comprises:
    invoking an API to use an interface associated with the SDCI provider;
    using the interface to connect to the connectivity gateway; and
    mapping a tag to the at least one virtual network.

13. The system of claim 8, wherein the connection between the at least one network segment of the enterprise network site and the at least one virtual network in the cloud environment comprises:
    providing a border gateway protocol configuration to the SDWAN router.

14. The system of claim 8, the operations further comprising:
    receiving updated configuration information;
    automatically discovering connections affected by the updated configuration information;
    automatically discovering one or more virtual networks on the cloud environment affected by the updated configuration information; and
    attaching a new cloud gateway to the one or more virtual networks affected by the updated configuration information.

15. A non-transitory computer-readable storage medium having stored therein instructions which, when executed by a processor, cause the processor to perform operations, the operations comprising:
    receiving configuration information associating at least one network segment of an enterprise network site with at least one virtual network in a cloud environment associated with a cloud service provider (CSP);
    configuring a software-defined wide-area network (SD-WAN) router associated with a software-defined cloud infrastructure (SDCI) provider with virtual cross connect data establishing a virtual cross connect, the virtual cross connect data connecting the enterprise network site to the cloud environment associated with the CSP;
    connecting a connectivity gateway in the cloud environment associated with the CSP to the at least one virtual network in the cloud environment; and
    configuring a connection between the at least one network segment of the enterprise network site and the at least one virtual network in the cloud environment through the connectivity gateway, wherein the connection is based at least in part on the configuration information.

16. The non-transitory computer-readable storage medium of claim 15, further comprising causing the connectivity gateway of the CSP to create a virtual interface of the SDCI.

17. The non-transitory computer-readable storage medium of claim 15, wherein the configuration information further comprises a connection speed associated with the connection between the at least one network segment of the enterprise network site and the at least one virtual network in the cloud environment.

18. The non-transitory computer-readable storage medium of claim 15, wherein the configuration information further comprises one or more virtual local area network (VLAN) identifiers associated with a network interface of the enterprise network site.

19. The non-transitory computer-readable storage medium of claim 15, wherein connecting the connectivity gateway to the at least one virtual network comprises:
    invoking an API to use an interface associated with the SDCI provider;
    using the interface to connect to the connectivity gateway; and
    mapping a tag to the at least one virtual network.

20. The non-transitory computer-readable storage medium of claim 15, wherein the connection between the at least one network segment of the enterprise network site and the at least one virtual network in the cloud environment comprises:
    providing a border gateway protocol configuration to the SDWAN router.

21. The non-transitory computer-readable storage medium of claim 15, the operations further comprising:
    receiving updated configuration information;
    automatically discovering connections affected by the updated configuration information;
    automatically discovering one or more virtual networks on the cloud environment affected by the updated configuration information; and
    attaching a new cloud gateway to the one or more virtual networks affected by the updated configuration information.

* * * * *